United States Patent [19]

Briskman

[11] Patent Number: 5,036,523
[45] Date of Patent: Jul. 30, 1991

[54] AUTOMATIC FREQUENCY CONTROL OF SATELLITE TRANSMITTED SPREAD SPECTRUM SIGNALS

[75] Inventor: Robert D. Briskman, Bethesda, Md.

[73] Assignee: Geostar Corporation, Washington, D.C.

[21] Appl. No.: 416,402

[22] Filed: Oct. 3, 1989

[51] Int. Cl.$^5$ ............................................... H04K 1/00
[52] U.S. Cl. ........................................................ 375/1
[58] Field of Search .................. 375/1; 380/34; 455/1; 370/98

[56] References Cited

U.S. PATENT DOCUMENTS

| | | | |
|---|---|---|---|
| 3,428,898 | 2/1969 | Jacobsen et al. | 455/12 |
| 4,435,822 | 3/1984 | Spencer et al. | 375/1 |
| 4,567,464 | 1/1986 | Siegel et al. | 370/98 |
| 4,630,283 | 12/1986 | Schiff | 375/1 |

FOREIGN PATENT DOCUMENTS

| | | | |
|---|---|---|---|
| 52-35916 | 3/1977 | Japan | 455/12 |
| 1444488 | 7/1976 | United Kingdom | |

*Primary Examiner*—Salvatore Cangialosi
*Attorney, Agent, or Firm*—Venable, Baetjer and Howard

[57] ABSTRACT

Automatic frequency control is provided in a satellite-based spread spectrum radio communication system by employing a pilot signal as a frequency reference. A transmitter inserts the pilot signal at a null point in the power versus frequency spectrum of the transmitted spread spectrum signal in order to minimize bandwidth requirements and to avoid interference between the pilot signal and the transmitted data.

59 Claims, 4 Drawing Sheets

AUTOMATIC FREQUENCY CONTROL OF SATELLITE TRANSMITTED SPREAD SPECTRUM SIGNALS

BACKGROUND OF THE INVENTION

The invention described and claimed herein relates generally to the field of communications, and is particularly concerned with a radio communication system in which signals are exchanged between ground-based transmitters and receivers through one or more relay satellites.

Many radio communication systems utilize satellites, particularly geostationary satellites, as signal relays in order to cover large geographic areas and to eliminate interference from terrestrial sources In fixed satellite communication systems, earth stations at fixed geographic locations transmit radio signals to a satellite which receives, amplifies, and rebroadcasts the transmissions at a shifted frequency in order to avoid interference with the received signals. The retransmitted signals are received by other earth stations at fixed locations. In this manner, point-to-point communication links can be established. Mobile satellite communication systems operate in much the same manner, although in this case the signals are relayed between mobile terminals which are carried by automobiles, trucks, airplanes, ships, or other movable platforms.

Both fixed and mobile satellite communication systems share certain limitations. One limitation relates to the fact that the frequency generators or oscillators used on board the satellites in order to achieve the desired frequency shift are subject to frequency drift. The occurrence of such drift can result in distortion of the received signals or, in some cases, in the total loss of the relayed transmissions.

Once a satellite is placed into orbit, it becomes difficult or impossible to control any drift that may occur in the satellite oscillator. While it is possible in principle to provide onboard systems that eliminate or compensate for drift, this option is not available for satellites already in use. In any event, such an approach may be impractical in many instances due to satellite weight budgets and other factors.

Satellite oscillator drift poses a particular problem in satellite communication systems which employ spread spectrum coding of the transmitted signals. The phrase "spread spectrum" generally refers to methods of radio transmission in which the frequency bandwidth of the transmissions greatly exceeds the minimum necessary to communicate the desired information. Several types of spread spectrum coding are possible. So-called "direct sequence" systems are those in which the carrier frequency is modulated by a digital code sequence whose bit or "chip" rate is much higher than the information bit rate. Other types of spread spectrum systems include frequency hopping systems, in which the carrier frequency is switched among a plurality of predetermined values, and chirp modulation systems, in which the carrier frequency is swept over a wide band during a given pulse interval. The advantages of spread spectrum coding include improved noise immunity and the ability to allow use of the same frequency band by multiple users without mutual interference.

In all types of spread spectrum communication systems, it is necessary for the receiver to acquire (i.e., synchronize to) the transmitted signal before the data can be decoded. This process, which is ordinarily carried out by phase locked loop circuits, introduces a finite delay between initial reception of a spread spectrum transmission and recognition of the transmitted data. In the case of continuous mode spread spectrum transmissions, the acquisition or lockup delay occupies only a small part of the time domain of the received signal and hence is not a serious problem. In some types of satellite-based systems, however, multiple users share the bandwidth simultaneously and the transmissions from any one user occur asynchronously in short bursts, separated by periods of inactivity. In such systems, it is essential that the receiver acquire lock quickly in order to avoid loss of the transmitted data. Satellite oscillator drift, which causes the carrier frequency received from the satellite to vary, can significantly increase signal acquisition time and must therefore be avoided.

Various methods have been employed in an attempt to detect and compensate for frequency drift in satellite-based spread spectrum communication systems. In some systems, for example, a pilot signal is transmitted to the satellite and then received back at a ground station, where the received signal is compared with a local standard to detect drift. In such systems, however, measures must be taken to avoid interference between the pilot signal and the transmitted data. Typically, this is done by transmitting the pilot signal at a carrier frequency which is outside the bandwidth of the information signal. This method, while effective, is disadvantageous in that additional bandwidth is required in order to accommodate the pilot signal. An alternative technique is to provide blanking intervals during which no data is transmitted, so that the receiver is able to detect the phase and frequency of the unmodulated carrier signal. This method avoids the need for an increase in bandwidth, but the net effect is to reduce the amount of data that can be transmitted during a given time interval. Accordingly, a need exists for a system which is capable of detecting and compensating for oscillator drift without requiring additional bandwidth and without affecting the efficiency of data transmission.

SUMMARY OF THE INVENTION

In accordance with the present invention, automatic frequency control is provided in a spread spectrum radio communication system by employing a pilot signal as a frequency reference. A transmitter inserts the pilot signal at a null point in the power versus frequency spectrum of the transmitted spread spectrum signal in order to minimize bandwidth requirements, to prevent the pilot signal from interfering with the transmitted data, and to prevent the transmitted data from interfering with the pilot signal.

In one aspect, the present invention relates to a radio communication system comprising a remote transmitter for transmitting an information signal having a power versus frequency spectrum characterized by at least one intermediate null frequency at which the signal power has a minimum value; a central station having a pilot signal transmitter for transmitting a pilot signal having a frequency substantially equal to the null frequency, and a receiver for receiving retransmitted information and pilot signals; a signal relay for receiving the information signal from the remote transmitter and the pilot signal from the central station, and for retransmitting the information and pilot signals to the central station, said signal relay including a local oscillator which is susceptible to frequency drift; and automatic frequency control means coupled to the receiver at the central station for detecting variations in the frequency of the received pilot signal and for adjusting the response of the receiver in such a manner as to accurately track the frequency of the received information signal despite frequency drift in the local oscillator.

Additional aspects of the present invention include the combination of a central station of the type described above with a signal relay susceptible to oscillator drift for receiving signals from a remote transmitter; the construction and operation of the central station per se; and methods for transmitting and receiving information signals and for carrying out automatic frequency control of the received signals using the exemplary apparatus disclosed and claimed herein. The invention has particular utility in satellite-based position determination and message transfer systems employing burst mode spread spectrum signals, but is also useful in other applications.

BRIEF DESCRIPTION OF THE DRAWINGS

The various objects, advantages, and novel features of the present invention will be more readily understood from the following detailed description when read in conjunction with the appended drawings, in which.

Throughout the drawings, like reference numerals will be understood to refer to like parts or components.

DETAILED DESCRIPTION OF THE PREFERRED EMBODIMENT

Figure 1:
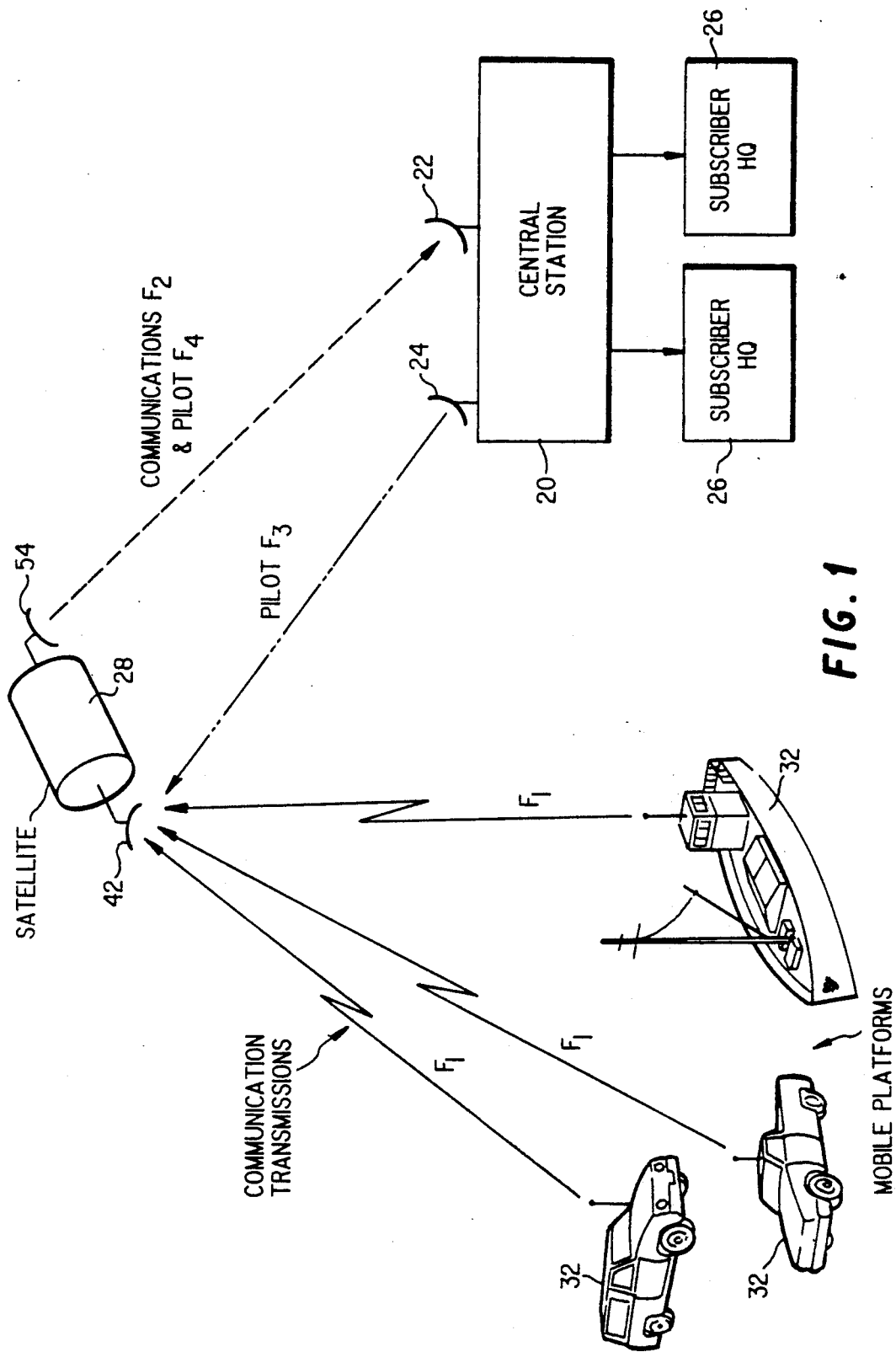
FIG. 1 is a schematic illustration of a mobile satellite communication system employing a fixed central station, a plurality of mobile platforms, and a satellite relay.

FIG. 1 is a schematic illustration of a satellite communication system operating in accordance with the principles of the present invention. The system comprises a fixed central station 20, a number of subscriber stations 26, at least one geostationary relay satellite 28, and number of mobile user platforms 32 carrying transmitting equipment for communicating with the satellite 28. The central station 20 includes a transmitting antenna 24 for transmitting a pilot signal to the satellite 28, and a receiving antenna for receiving the retransmitted pilot signal from the satellite 28 and the communications transmissions relayed from the mobile platforms 32. The two antennas 22 and 24 may be combined in certain applications.

Communications between the mobile platforms 32 and the central station 20 may be carried out in one of two different modes. In one mode, an outbound interrogation signal (not shown) is transmitted by the central station 20 to the satellite 28, where it is received, frequency shifted, and retransmitted to the mobile platforms 32. The mobile platforms respond to the received interrogation signals by transmitting burst mode reply signals containing identification and/or message information to the central station 20 through the satellite 28. The central station 20 transmits the received information to a number of subscriber stations 26 over terrestrial communication links, and may also relay messages from the subscriber stations 26 to the mobile platforms 32 as part of the outbound interrogation signal. If a number of relay satellites 28 are employed, the central station may be provided with the additional capability of calculating the position of each mobile platform 32 using time-difference-of-arrival methods, and providing this information to the subscriber stations 26 and/or to the mobile platforms 32.

In the second communication mode, the mobile platforms 32 transmit burst mode communication signals autonomously rather than in response to interrogation signals transmitted by the central station 20. The mobile platform transmissions may occur on an automatic basis (e.g., periodically or in response to internal or external sensors), or on a manual basis in response to a user input. In addition to providing identification and/or message information, the communication signals transmitted by the mobile platforms may also contain the platform location as obtained from an external source such as LORAN or GPS. The position information may be provided to the subscriber stations 26 along with the message and identification data.

Further details of the message exchange and position determination functions may be found in U.S. Pat. No. 4,359,733, issued to G. K. O'Neill on Nov. 16, 1982; in U.S. Pat. No. 4,744,083, issued to G. K. O'Neill and L. O. Snively on May 10, 1988; in U.S. Pat. No. 4,839,656, issued to G. K. O'Neill and L. O. Snively on June 13, 1989; in U.S. Pat. No. 4,943,974, issued to M. Motamedi on July 24, 1990; and in copending U.S. patent application Ser. No. 342,968, filed by R. D. Briskman on April 25, 1989; all of said patents and applications being expressly incorporated herein by reference.

In both of the communication modes described above, the inbound reply or communication signals from the mobile platforms 32 are transmitted to the satellite 28 at a common carrier frequency $F_1$ and are shifted to a different carrier frequency $F_2$ for retransmission to the central station 20. In order to increase noise immunity and allow multiple users to operate on the same frequency band, the user-transmitted signals (as well as the interrogation signal, if used) preferably comprise direct sequence spread spectrum signals employing pseudo-noise (PN) codes. The frequencies $F_1$ and $F_2$ correspond to the center frequencies of the original and retransmitted user signals, respectively, and both carrier frequencies are modulated by a PN code having a chip frequency of o per second.

Figure 2:
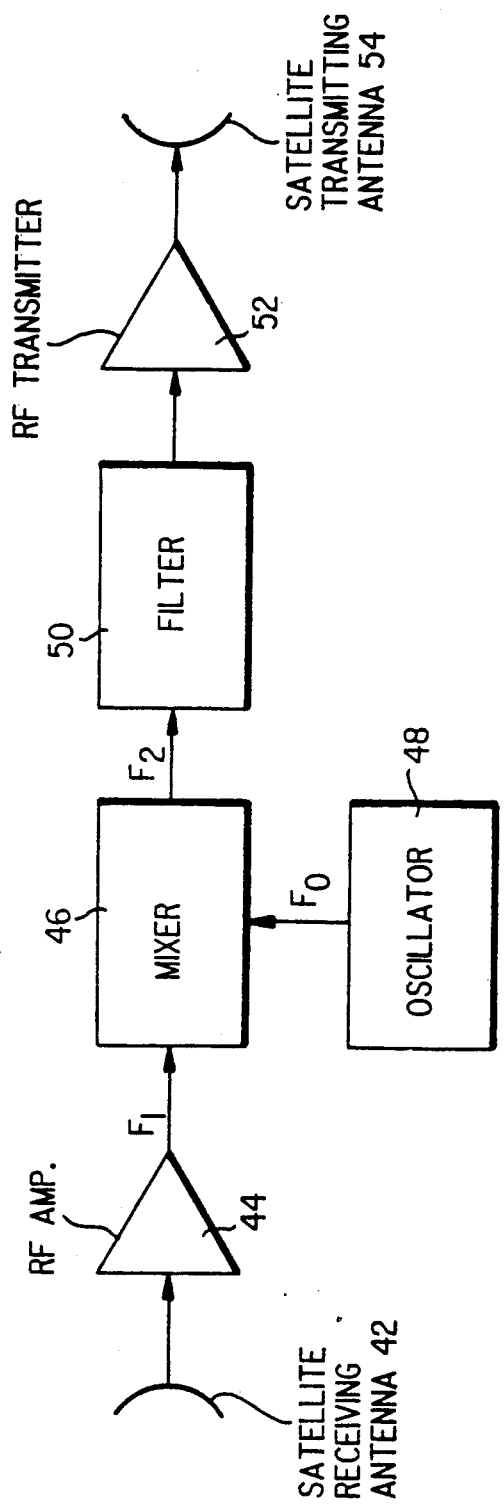
FIG. 2 is a schematic diagram illustrating the principal transponder components used in the satellite of FIG. 1.

The return channel of the satellite 28 is illustrated schematically in FIG. 2. Each mobile platform 32 transmits the inbound signal over its allocated frequency $F_1$ to the satellite receiving antenna 42, which applies the received signal as an input to an RF amplifier 44. The amplified signal is provided as an input to a mixer 46 along with the output $F_0$ of a local oscillator 48. The mixer 46 produces a frequency shifted version of the reply signal at an output frequency $F_2$. The mixer output is applied to a filter 50, RF transmitter 52, and satellite transmitting antenna 54 for transmission to the central station 20 of FIG. 1.

As is known, the output $F_2$ of the mixer 46 may be chosen to represent the sum or difference of the inputs $F_0$ and $F_1$. Thus, the relationship of the signal frequencies can be represented as follows:

$$F_2 = F_1 + F_0, \text{ or}$$

$$F_2 = F_1 - F_0 (\text{for } F_1 > F_0)$$

In either case, it will be appreciated that any drift in the oscillator frequency $F_0$ will cause a commensurate drift in the frequency $F_2$ of the retransmitted signals.

Figure 3A:
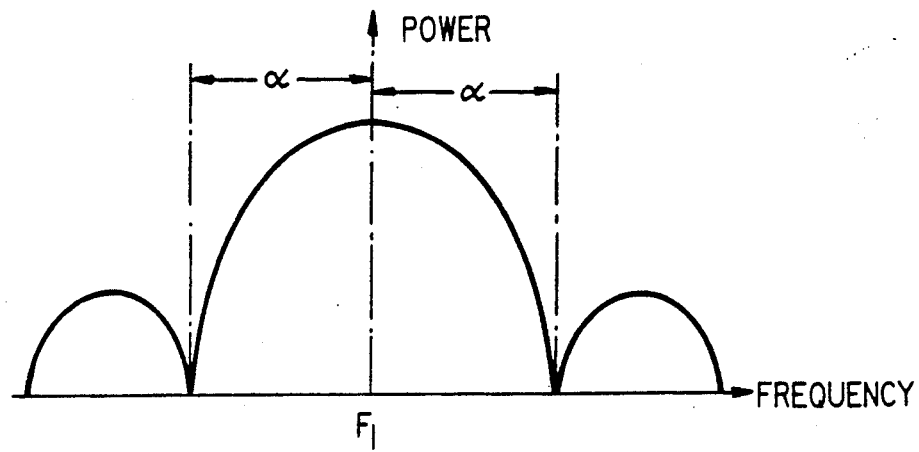
FIG. 3A is a graph representing the power versus frequency spectrum of the spread spectrum signals received at the satellite from the mobile platforms.

The inbound communication signals which are transmitted to the satellite 20 by the mobile platforms 32 have a power spectrum which is illustrated in FIG. 3A. The abscissa represents the frequency domain of the user signal and the ordinate represents the power or energy. Most of the signal energy which reaches the satellite 20 from the mobile platforms 32 is centered at frequency $F_1$ and drops off according to a known function of the chip frequency $\alpha$ of the spread spectrum modulation applied by the mobile transmitters. In particular, the power spectrum is defined by the function $(\sin x/x)^2$, which is characteristic of direct sequence spread spectrum signals. In this type of power spectrum, approximately 90% of the energy of the signal is within $\pm 2\alpha$ of $F_1$, and the energy of the signal goes to zero at various null points $F_1 \pm K\alpha$ (where $K = 1, 2, 3, 4, ...$). The user signals are retransmitted by the satellite 28 to the central station 20 at a shifted center frequency $F_2$, but have essentially the same energy distribution as illustrated in FIG. 3A.

In accordance with the present invention, a pilot or reference signal is transmitted by the transmitting antenna 24 at the ground station 20 to the receiving antenna 42 of the satellite 28. The transmitted pilot signal is a continuous, unmodulated carrier signal having a discrete frequency $F_3$ which is within the frequency domain of the user-transmitted signals centered about the frequency $F_1$, and which is located at one of the null points $F_1 \pm K\alpha$ of the energy distribution shown in FIG. 3A. Since the pilot signal is within the frequency spectrum of the communication signals transmitted to the satellite 20 by the mobile platforms 32, it is amplified by the satellite return channel of FIG. 2 and retransmitted to the ground station receiving antenna 22 along with the signals received from the mobile platforms.

Figure 3B:
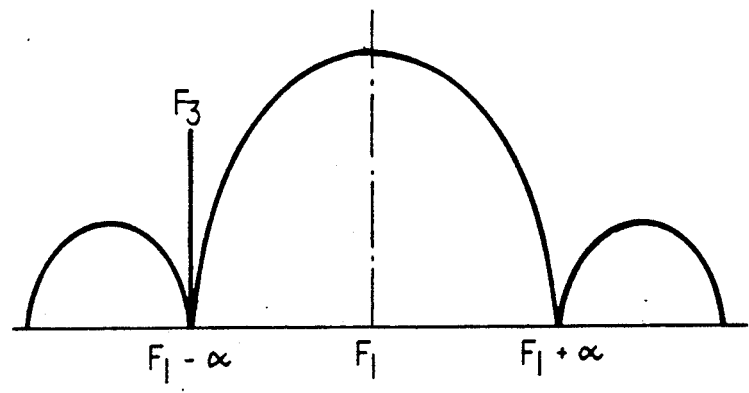
FIG. 3B is a graph representing the power versus frequency spectrum of the signals received at the satellite from the mobile platforms together with the pilot signal inserted by the central station.

FIG. 3B shows the power spectrum of the combined input to the satellite receiving antenna 42, comprising the user-transmitted signals centered at frequency $F_1$ and the inserted pilot signal at frequency $F_3$. In the illustrated example, the chosen pilot signal frequency is $F_1 - \alpha$, but the selection of $F_1 + \alpha$ as the pilot signal frequency produces equivalent results. Insertion of the pilot signal at the outer null frequencies (i.e., $F_1 \pm 2\alpha$ and beyond) is possible but is less desirable since the central station receiver may exhibit reduced sensitivity at these frequencies. In any event, it will be appreciated from FIG. 3B that the user-transmitted information signals centered at $F_1$ and the pilot signal at $F_3$ are virtually independent and do not interfere with each other because the energy of the pilot signal is confined to a frequency at which the energy of the user signals is essentially zero.

When the inbound signals from the mobile platforms 32 are shifted to the frequency $F_2$ by the satellite return channel of FIG. 2, the frequency of the pilot signal is likewise shifted to a new value $F_4$. The frequency shift of the pilot signal, which may be expressed as:

$$F_4 = F_3 + F_0, \text{ or}$$

$$F_4 = F_3 - F_0 (\text{for } F_3 > F_0)$$

is the same as the frequency shift of the signals transmitted by the mobile platforms 32 and is equal to the oscillator frequency $F_0$. Thus, any change in the oscillator frequency $F_0$ results in corresponding changes in both the retransmitted user signal frequency $F_2$ and the retransmitted pilot signal frequency $F_4$. This is illustrated in FIG. 3C, which shows the power spectrum of the combined return signal from the satellite 28, comprising the retransmitted user signals centered at frequency $F_2$ and the retransmitted pilot signal at frequency $F_4$.

Figure 3C:
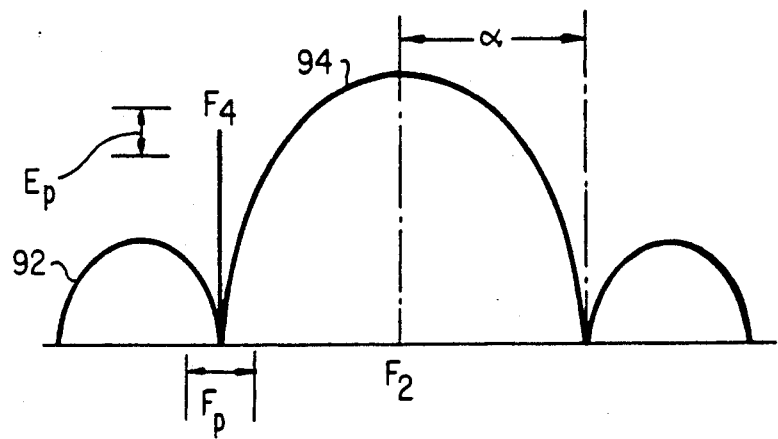
FIG. 3C is a graph representing the power versus frequency spectrum of the signals transmitted by the satellite in response to the received signals illustrated in FIG. 3B.

As noted above, the overall power spectrum of the combined return signal in FIG. 3C is essentially the same as that of the transmitted signals in FIGS. 3A and 3B. Thus, in the illustrated embodiment, the frequency $F_4$ of the retransmitted pilot signal exists at the $-\alpha$ null point of the power spectrum of the retransmitted user signal. This relationship assures that the retransmitted versions of the user signal and of the inserted pilot signal are independent and do not interfere with each other at the central station 20.

Figure 4:
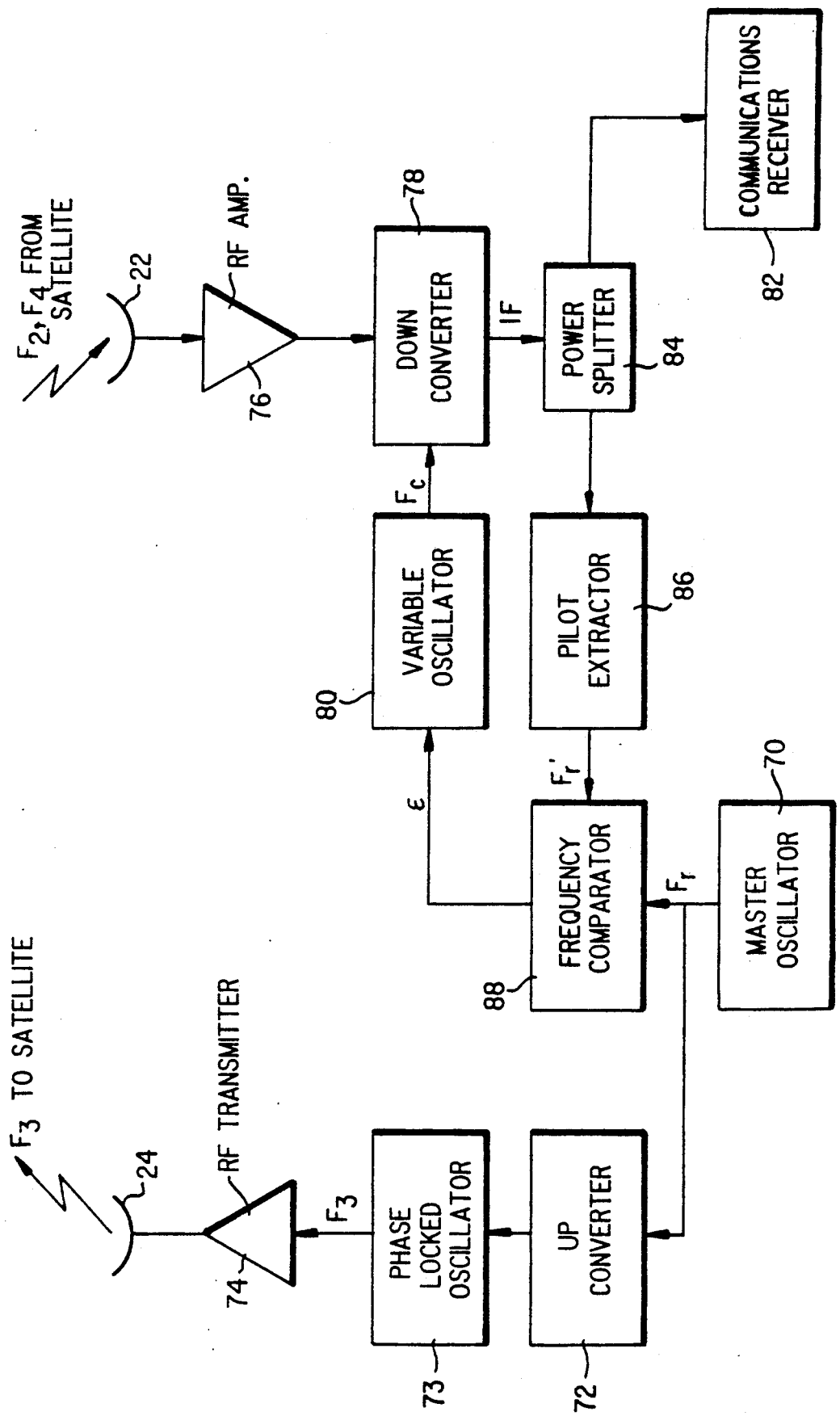
FIG. 4 is a schematic diagram illustrating the principal components of the pilot signal subsystem used in the central station of FIG. 1.

The pilot signal subsystem employed at the central station 20 is illustrated in FIG. 4. A highly stable master oscillator 70 produces a reference frequency $F_4$ which is in the range of the intermediate frequency (IF) used by the spread spectrum receiver circuitry of the central station. Typically, this latter frequency is approximately 70 MHz. The output signal from the oscillator 70 is provided as an input to an up converter 72 which mixes the frequency $F_r$ with a second frequency (from a source not shown) to produce the pilot signal carrier frequency $F_3$. A phase locked oscillator 73 is connected to the output of the up converter 72 to stabilize the pilot signal at the desired carrier frequency $F_3$. An RF transmitter 74 amplifies the pilot signal and continuously transmits it to the satellite 28 of FIG. 1 by means of the central station transmitting antenna 24. At the satellite (FIG. 2), both the pilot signal carrier frequency $F_3$ and the mobile platform signals centered at the frequency F are received by the receiving antenna 42, amplified, shifted by the oscillator frequency $F_0$, and retransmitted by the satellite transmitting antenna 54 to the receiving antenna 22 of the central station 20.

With further reference to FIG. 4, the received user and pilot signals are amplified by an RF amplifier 76 and applied to the input of a down converter 78. In the down converter 78, the user and pilot signals at frequencies $F_2$ and $F_4$, respectively, are mixed with a control frequency $F_c$ produced by a variable oscillator 80. The variable oscillator may comprise a phase locked oscillator or a voltage controlled oscillator. The output of the down converter 78 is an intermediate frequency (IF) signal of approximately 70 MHz which is coupled to a spread spectrum communications receiver 82 through a power splitter 84. The other output of the power splitter 84 is coupled to a pilot extractor circuit 86 which extracts the downconverted pilot signal from the user-transmitted information signals. The frequency $F_r'$ of the downconverted pilot signal will, in the absence of satellite oscillator drift, be equal to the reference frequency $F_r$ from the oscillator 70. To detect any drift which may be occurring, the frequencies $F_r$ and $F_r'$ are applied as inputs to a frequency comparator 88. The comparator 88 produces a difference signal $\epsilon$ which may consist of a digital value, a DC voltage level, or the like. The difference signal $\epsilon$ is applied as a control input to the variable oscillator 80. As a result, the control frequency $F_c$ produced by the oscillator 80 changes with excursions in the intermediate frequency $F_r'$ of the received pilot signal. Thus, if the received pilot signal frequency increases or decreases due to drift in the frequency $F_0$ of the satellite oscillator 48, the resulting difference between the reference frequency $F_r$ and the downconverted frequency $F_r'$ of the returned pilot signal will cause the comparator 88 to produce a corresponding difference signal $\epsilon$. This, in turn, causes the variable oscillator 80 to increase or decrease the control frequency $F_c$ as necessary in order to maintain a constant intermediate frequency (IF) input to the communications receiver 82.

The pilot extractor 86 is a highly selective bandpass filter which searches for the nominal frequency $F_r$ of the downconverted IF pilot signal received from the satellite 28. The passband of the filter is selected to accommodate a worst case anticipated drift in the satellite oscillator 48. In order to avoid possible confusion between the pilot signal and the data signals from the mobile platforms 32, the pilot extractor 86 may also include a threshold detector which admits only inputs above a certain power or energy level and below another level. For example, with reference to FIG. 3C, the pilot extractor may be sensitive to the frequency band $F_p$ around the $-\alpha$ null point in the power spectrum of the received signal. Within that frequency band, the pilot extractor 86 may be responsive only to signal energies within a band $E_p$ which is above the energy of the side lobe 92 and below the energy of the main lobe 94 centered at $F_2$. In this way, the pilot signal can be accurately extracted from the mobile platform information signals and used for comparison with the reference frequency $F_r$ to provide the desired automatic frequency control.

It will be appreciated from the foregoing description that the use of a continuous pilot signal in accordance with the present invention allows the central station to adapt immediately to changes in the received frequency due to satellite oscillator drifts, even during intervals when no information signals are being received from the mobile platforms 32. This is important in allowing fast acquisition of burst mode spread spectrum transmissions. Furthermore, insertion of the pilot signal at a null point in the power spectrum of the information signals minimizes bandwidth utilization, allows the spread spectrum encoded data to be recovered without distortion, and permits the level of the pilot signal to be selected without concern for interference with (or by) the information signal.

Although the present invention has been described with reference to a preferred embodiment, the invention is not limited to the details thereof. For example, the pilot signal may be transmitted from a location other than that of the central station, and the signal relays need not comprise satellites. Other substitutions and modifications will occur to those of ordinary skill in the art, and all such substitutions and modifications are intended to fall within the scope of the invention as defined in the appended claims.

What is claimed is:

1. A radio communication system, comprising:

a remote transmitter for transmitting a burst mode, direct sequence spread spectrum information signal having a carrier center frequency $F_1$, a chip frequency $\alpha$, and a power versus frequency spectrum characterized by at least one intermediate null frequency at which the signal power has a minimum value, said null frequency occurring at $F_1 \pm K\alpha$, where K is an integer equal to or greater than 1;

a central station having a pilot signal transmitter for transmitter a pilot signal in the form of a continuous unmodulated carrier signal having a frequency substantially equal to said null frequency, and a receiver for receiving retransmitted information and pilot signals;

a signal relay for receiving the information signal from said remote transmitter and the pilot signal from said central station, and for retransmitting said information and pilot signals to the central station, said signal relay including a local oscillator which is susceptible to frequency drift; and automatic frequency control means coupled to the receiver at said central station for detecting variations in the frequency of the received pilot signal and for adjusting the response of the receiver in accordance with said variations.

2. A communication system as claimed in claim 1, wherein said pilot signal has a frequency substantially equal to $F_1 \pm \alpha$.

3. A communication system as claimed in claim 1, wherein said signal relay comprises a satellite.

4. A communication system as claimed in claim 1, wherein said signal relay retransmits the information signal and the pilot signal at shifted frequencies, the amount of frequency shift being determined by said local oscillator and being essentially the same for the pilot signal frequency and for the center frequency of the information signal.

5. A communication system as claimed in claim 1, wherein:

said receiver comprises a down converter for converting the frequency of the received signals to an intermediate frequency by mixing the received frequency with a control frequency, said down converter having a first input for the received signals, a second input for the reference frequency, and an output for the intermediate frequency; and said automatic frequency control means comprises a control circuit connected between said down converter output and said second input for detecting the frequency of the downconverted pilot signal and for generating a control frequency which varies in accordance with said detected frequency.

6. A radio communication system as claim in claim 5, wherein said control circuit comprises:

a pilot signal extractor having an input coupled to said down converter output, and an output;

a frequency comparator input coupled to the output of said pilot extractor, a second input, and an output;

a fixed frequency oscillator having an output coupled to the second input of said frequency comparator for generating a pilot signal reference frequency; and a variable frequency oscillator for generating said control frequency, said variable frequency oscillator having an input coupled to the output of said frequency comparator and an output coupled to the second input of said down converter.

7. A radio communication system as claimed in claim 6, further comprising a communications receiver having an input coupled to the intermediate frequency output of said down converter.

8. A radio communications system as claimed in claim 7, further comprising a power splitter interposed between the intermediate frequency output of said down converter and the inputs of said communications receiver and said pilot signal extractor.

9. A radio communication system as claimed in claim 6, wherein said pilot signal extractor comprises a bandpass filter.

10. A radio communication system as claimed in claim 6, wherein said pilot signal extractor further comprises a threshold detector for passing only signals having predetermined energy levels.

11. A radio communication system as claimed in claim 10, wherein:
the power versus frequency spectrum of the information signal comprises a main lobe having a peak energy at said center frequency and a pair of side lobes having peak energies less than that of the main lobe; and
said threshold detector passes only signals having energy levels than the peak energy of the main lobe and greater than the peak energies of the side lobes.

12. A radio communication system as claimed in claim 6, wherein said variable oscillator comprises a phase locked oscillator.

13. A radio communication system as claimed in claim 6, wherein said variable oscillator comprises a voltage controlled oscillator.

14. A radio communication system as claimed in claim 1, wherein said central station further comprises a common fixed frequency oscillator coupled to said pilot signal transmitter and to said automatic frequency control means.

15. A radio communication system for receiving a burst mode, direct sequence spread spectrum information signal from a remote transmitter, said information signal having a carrier center frequency $F_1$ a chip frequency $\alpha$, and a power versus frequency spectrum characterized by at least one intermediate null frequency at which the signal power has a minimum value, said null frequency occurring at $F_1 \pm K\alpha$, where K is an integer equal to or greater than 1, said communication system comprising:
a central station having a pilot signal transmitter for transmitting a pilot signal in the form of a continuous unmodulated carrier signal having a frequency substantially equal to said null frequency, and a receiver for receiving retransmitted information and pilot signals;
a signal relay for receiving the information signal from said remote transmitter and the pilot signal from said central station and for retransmitting said information and pilot signals to the central station, said signal relay including a local oscillator which is susceptible to frequency drift; and
automatic frequency control means coupled to the receiver at said central station for detecting variations in the frequency of the received pilot signal and for adjusting the response of the receiver in accordance with said variations.

16. A communication system as claimed in claim 15, wherein said pilot signal has a frequency substantially equal to $F_1 \pm \alpha$.

17. A communication system as claimed in claim 15, wherein said signal relay comprises a satellite.

18. A communication system as claimed in claim 15, wherein said signal relay retransmits the information signal and the pilot signal at shifted frequencies, the amount of frequency shift being determined by said local oscillator and being essentially the same for the pilot signal frequency and for the center frequency of the information signal.

19. A communication system as claimed in claim 15, wherein:
said receiver comprises a down converter for converting the frequency of the received signals to an intermediate frequency by mixing the received frequency with a control frequency, said down converter having a first input for the received signals, a second input for the reference frequency, and an output for the intermediate frequency; and
said automatic frequency control means comprises a control circuit connected between said down converter output and said second input for detecting the frequency of the downconverted pilot signal and for generating a control frequency which varies in accordance with said detected frequency.

20. A radio communication system as claim in claim 19, wherein said control circuit comprises:
a pilot signal extractor having an input coupled to said down converter output, and an output;
a frequency comparator having a first input coupled to the output of said pilot extractor, a second input, and an output;
a fixed frequency oscillator having an output coupled to the second input of said frequency comparator for generating a pilot signal reference frequency; and
a variable frequency oscillator for generating said control frequency, said variable frequency oscillator having an input coupled to the output of said frequency comparator and an output coupled to the second input of said down converter.

21. A radio communication system as claimed in claim 20, further comprising a communications receiver having an input coupled to the intermediate frequency output of said down converter.

22. A radio communications system as claimed in claim 21, further comprising a power splitter interposed between the intermediate frequency output of said down converter and the inputs of said communications receiver and said pilot signal extractor.

23. A radio communication system as claimed in claim 20, wherein said pilot signal extractor comprises a bandpass filter.

24. A radio communication system as claimed in claim 20, wherein said pilot signal extractor further comprises a threshold detector for passing only signals having predetermined energy levels.

25. A radio communication system as claimed in claim 24, wherein:
the power versus frequency spectrum of the information signal comprises a main lobe having a peak energy at said center frequency and a pair of side lobes having peak energies less than that of the main lobe; and
said threshold detector passes only signals having energy levels less than the peak energy of the main lobe and greater than the peak energies of the side lobes.

26. A radio communication system as claimed in claim 20, wherein said variable oscillator comprises a phase locked oscillator.

27. A radio communication system as claimed in claim 20, wherein said variable oscillator comprises a voltage controlled oscillator.

28. A radio communication system as claimed in claim 15, wherein said central station further comprises a common fixed frequency oscillator coupled to said pilot signal transmitter and to said automatic frequency control means.

29. A radio communication system for receiving a burst mode, direct sequence spread spectrum information signal from a remote transmitter through a signal relay having a local oscillator which is susceptible to frequency drift, said information signal having a carrier center frequency $F_1$, a chip frequency $\alpha$, and a power versus frequency spectrum characterized by at least one intermediate null frequency at which the signal power has a minimum value, said null frequency occurring at $F_1 \pm K\alpha$, where K is an integer equal to or greater than 1, said communication system comprising:
  a pilot signal transmitter for transmitting to said signal relay a pilot signal in the form of a continuous unmodulated carrier signal having a frequency substantially equal to said null frequency;
  a receiver for receiving retransmitted information and pilot signals from said signal relay;
  automatic frequency control means coupled to said receiver for detecting variations in the frequency of the received pilot signal and for adjusting the response of the receiver in accordance with said variations.

30. A communication system as claimed in claim 29, wherein said pilot signal has a frequency substantially equal to $F_1 \pm \alpha$.

31. A communication system as claimed in claim 29, wherein:
  said receiver comprises a down converter for converting the frequency of the received signals to an intermediate frequency by mixing the received frequency with a control frequency, said down converter having a first input for the received signals, a second input for the reference frequency, and an output for the intermediate frequency; and
  said automatic frequency control means comprises a control circuit connected between said down converter output and said second input for detecting the frequency of the downconverted pilot signal and for generating a control frequency which varies in accordance with said detected frequency.

32. A radio communication system as claim in claim 31, wherein said control circuit comprises:
  a pilot signal extractor having an input coupled to said down converter output, and an output;
  a frequency comparator having a first input coupled to the output of said pilot extractor, a second input, and an output;
  a fixed frequency oscillator having an output coupled to the second input of said frequency comparator for generating a pilot signal reference frequency; and
  a variable frequency oscillator for generating said control frequency, said variable frequency oscillator having an input coupled to the output of said frequency comparator and an output coupled to the second input of said down converter.

33. A radio communication system as claimed in claim 32, further comprising a communications receiver having an input coupled to the intermediate frequency output of said down converter.

34. A radio communications system as claimed in claim 33, further comprising a power splitter interposed between the intermediate frequency output of said down converter and the inputs of said communications receiver and said pilot signal extractor.

35. A radio communication system as claimed in claim 32, wherein said pilot signal extractor comprises a bandpass filter.

36. A radio communication system as claimed in claim 32, wherein said pilot signal extractor further comprises a threshold detector for passing only signals having predetermined energy levels.

37. A radio communication system as claimed in claim 36, wherein:
  the power versus frequency spectrum of the information signal comprises a main lobe having a peak energy at said center frequency and a pair of side lobes having peak energies less than that of the main lobe; and
  said threshold detector passes only signals having energy levels less than the peak energy of the main lobe and greater than the peak energies of the side lobes.

38. A radio communication system as claimed in claim 32, wherein said variable oscillator comprises a phase locked oscillator.

39. A radio communication system as claimed in claim 32, wherein said variable oscillator comprises a voltage controlled oscillator.

40. A radio communication system as claimed in claim 29, further comprising a common fixed frequency oscillator coupled to said pilot signal transmitter and to said automatic frequency control means.

41. A method for transmitting an information signal from a transmitting station to a receiving station through a signal relay having a local oscillator which is subject to frequency drift, said method comprising the steps of:
  transmitting a burst mode, direct sequence spread spectrum information signal from said transmitting station to said signal relay, said information signal having a carrier center frequency $F_1$, a chip frequency $\alpha$, and a power versus frequency spectrum characterized by at least one intermediate null frequency at which the signal power has a minimum value, said null frequency occurring at $F_1 \pm K\alpha$, where K is an integer equal to or greater than 1;
  receiving the information signal at said signal relay and retransmitting said information signal to the receiving station;
  transmitting a pilot signal to the signal relay, said pilot signal comprising a continuous unmodulated carrier signal having a frequency substantially equal to the null frequency of the transmitted information signal;
  receiving the pilot signal at said signal relay and retransmitting said pilot signal to the receiving station;
  receiving the retransmitted information and pilot signals at the receiving station;
  detecting variations in the frequency of the pilot signal received at the receiving station; and
  carrying out automatic frequency control at the receiving station based on said detected variations.

42. A method as claimed in claim 41, wherein said pilot signal has a frequency substantially equal to $F_1 \pm \alpha$.

43. A method as claimed in claim 41, wherein said signal relay comprises a satellite.

44. A method as claimed in claim 41, wherein the steps of retransmitting said information and pilot signals to the receiving station include shifting the frequency of said signals by substantially equal amounts.

45. A method as claimed in claim 41, wherein the step of transmitting a pilot signal to the signal relay is carried out by the receiving station.

46. A method as claimed in claim 41, wherein:
the step of receiving the retransmitted information and pilot signals at the receiving station comprises downconverting said signals to an intermediate frequency by mixing the received frequency with a control frequency; and
the step of carrying out automatic frequency control at the receiving station comprises generating said control frequency in accordance with said detected variations in the frequency of the downconverted pilot signal.

47. A method as claimed in claim 41, wherein the step of detecting variations in the frequency of the pilot signal received at the receiving station comprises comparing said frequency with a reference frequency used to generate said pilot signal.

48. A method as claimed in claim 44, wherein the step of detecting variations in the frequency of the pilot signal received at the receiving station includes extracting the pilot signal from the information signal by bandpass filtering.

49. A method as claimed in claim 44, wherein the step of detecting variations in the frequency of the pilot signal received at the receiving station includes extracting the pilot signal from the information signal by threshold detection of signals having predetermined energy levels.

50. A method as claimed in claim 49, wherein:
the power versus frequency spectrum of the information signal comprises a main lobe having a peak energy at said center frequency and a pair of side lobes having peak energies less than that of the main lobe; and
said threshold detection is effective to pass only signals having energy levels less than the peak energy of the main lobe and greater than the peak energies of the side lobes.

51. A method for carrying out automatic frequency control of a burst mode, direct sequence spread spectrum information signal received at a receiving station from a transmitting station through a signal relay having a local oscillator which is subject to frequency drift, said information signal having a carrier center frequency $F_1$, a chip frequency $\alpha$, and a power versus frequency spectrum characterized by at least one intermediate null frequency at which the signal power has a minimum value, said null frequency occurring at $F_1 \pm K\alpha$, where K is an integer equal to or greater than 1, said method comprising the steps of:

transmitting a pilot signal to the signal relay, said pilot signal comprising a continuous unmodulated carrier signal having a frequency substantially equal to the null frequency of the transmitted information signal;
receiving the pilot signal at said signal relay and retransmitting the pilot signal to the receiving station;
receiving the information signal and the retransmitting pilot signal at the receiving station;
detecting variations in the frequency of the pilot signal received at the receiving station;
adjusting the response of receiving equipment at the receiving station in accordance with said detected variations.

52. A method as claimed in claim 51, wherein said pilot signal has a frequency substantially equal to $F_1 \pm \alpha$.

53. A method as claimed in claim 51, wherein the step of retransmitting the pilot signal to the receiving station includes shifting the frequency of said signal.

54. A method as claimed in claim 51, wherein the step of transmitting a pilot signal to the signal relay is carried out by the receiving station.

55. A method as claimed in claim 51, wherein:
the step of receiving the information and pilot signals at the transmitting station comprises downconverting said signals to an intermediate frequency by mixing the received frequency with a control frequency; and
the step of adjusting the response of receiving equipment at the receiving station comprises generating said control frequency in accordance with said detected variations in the frequency of the downconverted pilot signal.

56. A method as claimed in claim 51, wherein the step of detecting variations in the frequency of the pilot signal received at the receiving station comprises comparing said frequency with a reference frequency used to generate said pilot signal.

57. A method as claimed in claim 51, wherein the step of detecting variations in the frequency of the pilot signal received at the receiving station includes extracting the pilot signal from the information signal by bandpass filtering.

58. A method as claimed in claim 51, wherein the step of detecting variations in the frequency of the pilot signal received at the receiving station includes extracting the pilot signal from the information signal threshold detection of signals having predetermined energy levels.

59. A method as claimed in claim 58, wherein:
the power versus frequency spectrum of the information signal comprises a main lobe having a peak energy at said center frequency and a pair of side lobes having peak energies less than that of the main lobe; and
said threshold detection is effective to pass only signals having energy levels less than the peak energy of the main lobe and greater than the peak energies of the side lobes.

* * * * *